United States Patent [19]
Reitmeier

[11] Patent Number: 4,631,584
[45] Date of Patent: Dec. 23, 1986

[54] TRANSMISSION OF REDUCED RESOLUTION PICTURE EDGE INFORMATION USING HORIZONTAL BLANKING PERIOD

[75] Inventor: Glenn A. Reitmeier, Trenton, N.J.

[73] Assignee: RCA Corporation, Princeton, N.J.

[21] Appl. No.: 576,916

[22] Filed: Feb. 3, 1984

[51] Int. Cl.⁴ .................................... H04N 7/093
[52] U.S. Cl. ................................. 358/141; 358/147
[58] Field of Search .................. 358/141, 142, 11, 12, 358/147, 87, 133, 214, 54, 146

[56] References Cited

U.S. PATENT DOCUMENTS

| | | | |
|---|---|---|---|
| 3,436,471 | 4/1969 | Mounts et al. | 358/142 |
| 4,551,754 | 11/1985 | Meise et al. | 358/180 |
| 4,556,906 | 12/1985 | Dischert | 358/180 |

OTHER PUBLICATIONS

International Broadcasting Convention, "Systems Concepts in High Fidelity Television" by R. N. Jackson and S. L. Tan, pp. 135–139, published by IEE, 9/82.
Kerns H. Powers, "Compatibility Aspects of HDTV", High Definition Television Colloquium, pp. 1.6–1 to 1.6–17, 10/82.
Article by R. Jurgen entitled "The Problems and Promises of High Definition Television", published in IEEE Spectrum, Dec. 1983, pp. 46–51.

Primary Examiner—Tommy P. Chin
Assistant Examiner—David E. Harvey
Attorney, Agent, or Firm—P. J. Rasmussen; P. M. Emanuel; R. G. Coalter

[57] ABSTRACT

A television system for generating a composite video signal for an image having extended aspect ratio such as 5:3, and for displaying such composite video signal in a television image area having the same extended aspect ratio. The horizontal blanking interval of an NTSC composite video signal is utilized for the transmission of video information characterizing either the right or the left edge of a display line of the picture; whereas, the remaining portion of the NTSC signal is utilized for the transmission of video information characterizing the inner portion of the display line between the edges. The video information for the missing edge in each display line is derived in the receiver from video edge information of adjacent display lines.

3 Claims, 34 Drawing Figures

FILTER 109 OF FIGURE 2a

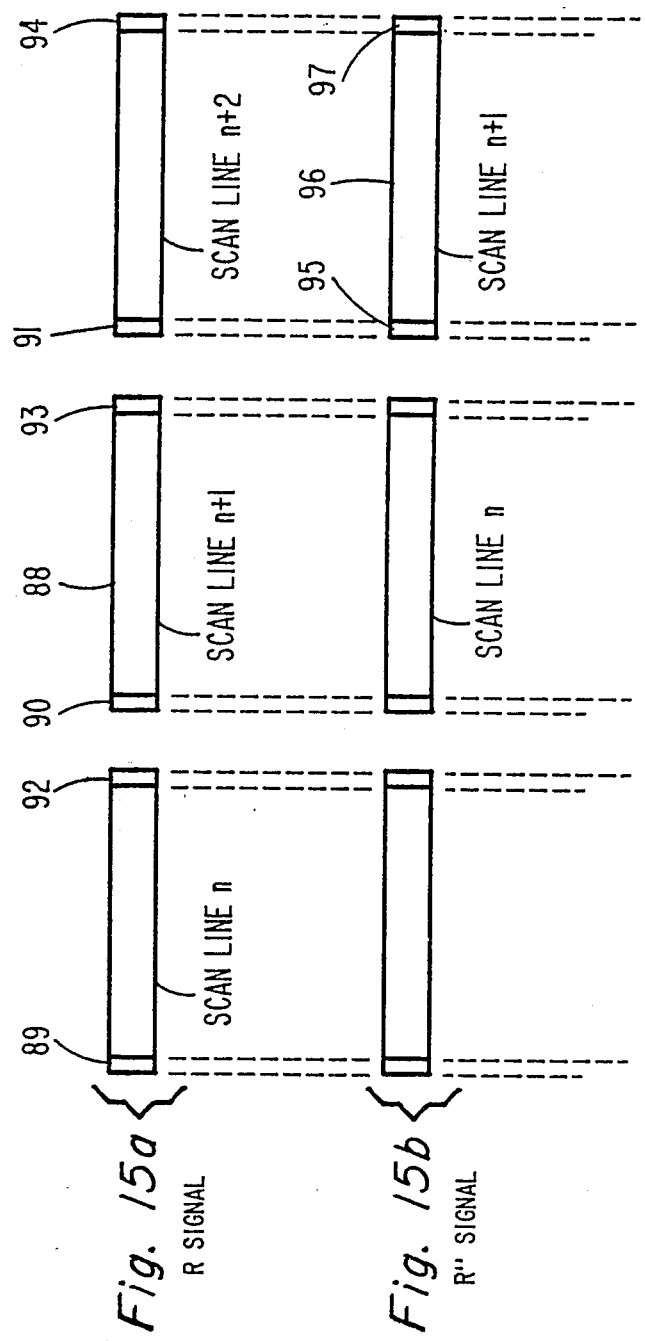

TRANSMISSION OF REDUCED RESOLUTION PICTURE EDGE INFORMATION USING HORIZONTAL BLANKING PERIOD

BACKGROUND OF THE INVENTION

The invention relates to television systems in which an image of a picture may be displayed on an imaging display device having a viewing aspect ratio different from that of a conventional imaging display device.

In a typicel conventional television system, the ratio of the picture width to its height at the display device is 4:3. This ratio is called the aspect ratio. Recently, there has been an interest in using wider aspect ratios for television systems such as 2:1 or 5:3 ratios, which more nearly equal the ratio of width to height that is viewed by the human eye. The 5:3 aspect ratio has received particular attention since release prints for motion pictures film in the United States employ this ratio and thus the pictures of such prints may be transmitted and received without cropping. It may be desirable that a television system adapted to send and receive an extended aspect ratio picture be also compatible with a conventional system in which the picture information has a 4:3 aspect ratio.

Furthermore, it may be desirable to display a picture having the conventional aspect ratio on a screen of an extended aspect ratio receiver without suffering degradation of the sharpness of the picture or increased noise content, particularly in an area of the display where either a picture with the extended aspect ratio or a picture with the conventional aspect ratio may be displayed.

It may be also desirable to display a video signal containing extended aspect ratio picture information in a receiver having a conventional aspect ratio display by displaying only that portion of the picture which may fit its display. Such television receiver may be required to extract timing information, as provided by the horizontal sync pulses, for example, from the signal containing extended aspect ratio picture information.

In a conventional television system, a displayed video signal of each scan line is sent during a predefined portion of scan line time. For example, in the NTSC system, the displayed video signal is sent during a 52.6 microseconds period of a scan line time. Conventionally, the displayed video signal is displayed on the screen at the same rate in which it is received. That portion of the scan period not occupied by the displayed video signal, called the blanking period, is utilized for sending a sync signal such as the horizontal sync, and also a color burst signal, where applicable. According to the NTSC standard, the blanking period occupies 10.9 microseconds out of 63.5 microseconds of a scan line time.

The NTSC standard defines the bandwidth of the transmitted video signal and the scanning frequency. The bandwidth and the scanning frequency determine, to a great extent, the sharpness of picture details along a scan line.

One feature of the invention is a television system with an extended aspect ratio capability in which the scanning frequency of the conventional television system may be maintained.

Another feature of the invention is a television system in which the bandwidth required to transmit and receive video information for a picture having extended aspect ratio need not be increased in comparison with that of the conventional television system.

One aspect of the invention is a provision, used with a conventional aspect ratio television receiver for displaying a picture having an extended aspect ratio, by cropping out a portion of the picture so that the remaining portion of the picture is adapted for display without suffering dimensional distortions.

Another aspect of the invention is a provision, used with a television receiver capable of displaying an extended aspect ratio picture for displaying a conventional television signal without suffering dimensional distortions.

SUMMARY OF THE INVENTION

A television apparatus for generating an extended video signal that provides picture information for display lines of a television display. Each one of the display lines includes an inner range portion located inside an inner image area having dimensions of a first aspect ratio and includes first and second outer range portions located outside the inner image area. The display lines define an image area having dimensions of an aspect ratio that is extended relative to the first aspect ratio. The apparatus includes means for generating a first signal part that contains picture information to be displayed in the inner range portions of the display lines; it includes means for generating a second signal part that contains picture information to be displayed in the first outer range portions of the display lines; it includes means for generating a third signal part that contains picture information to be displayed in the second outer range portions of the display lines; and it includes means responsive to the first, second and third signal parts for generating the extended video signal. All the picture information contained in the portion of the extended video signal that is associated with a first display line is to be displayed in the inner range portion and in only one of the first and second outer range portions of the first display line; and all the picture information contained in the portion of the extended video signal that is associated with a second display line is to be displayed in the inner range portion and in only the other portion of the first and second outer range portions.

To display the extended video signal, the receiver apparatus includes means responsive to the extended video signal for generating a signal that contains picture information suitable for display in the inner range portions of the display lines, means responsive to the extended video signal for generating a signal that contains picture information suitable for display in the first outer range portion of the display lines, and means responsive to the extended video signal for generating a signal that contains picture information suitable for display in the second outer range portion of the display lines.

BRIEF DESCRIPTION OF THE DRAWINGS

FIGS. 5a, b, c, d, e and g illustrate timing diagrams associated with generating the composite extended video signal of FIG. 3c in the system of FIG. 2a;

FIGS. 6a, b, c, d and e illustrate timing diagrams associated with generating the composite extended video signal of FIGS. 3a and 3b in the system of FIG. 2a;

FIG. 14 illustrates a filter circuit of the television system illustrated in FIG. 2a; and FIG. 15 illustrates the timing diagrams associated with the filter of FIG. 14.

DETAILED DESCRIPTION OF THE INVENTION

Figure 1:
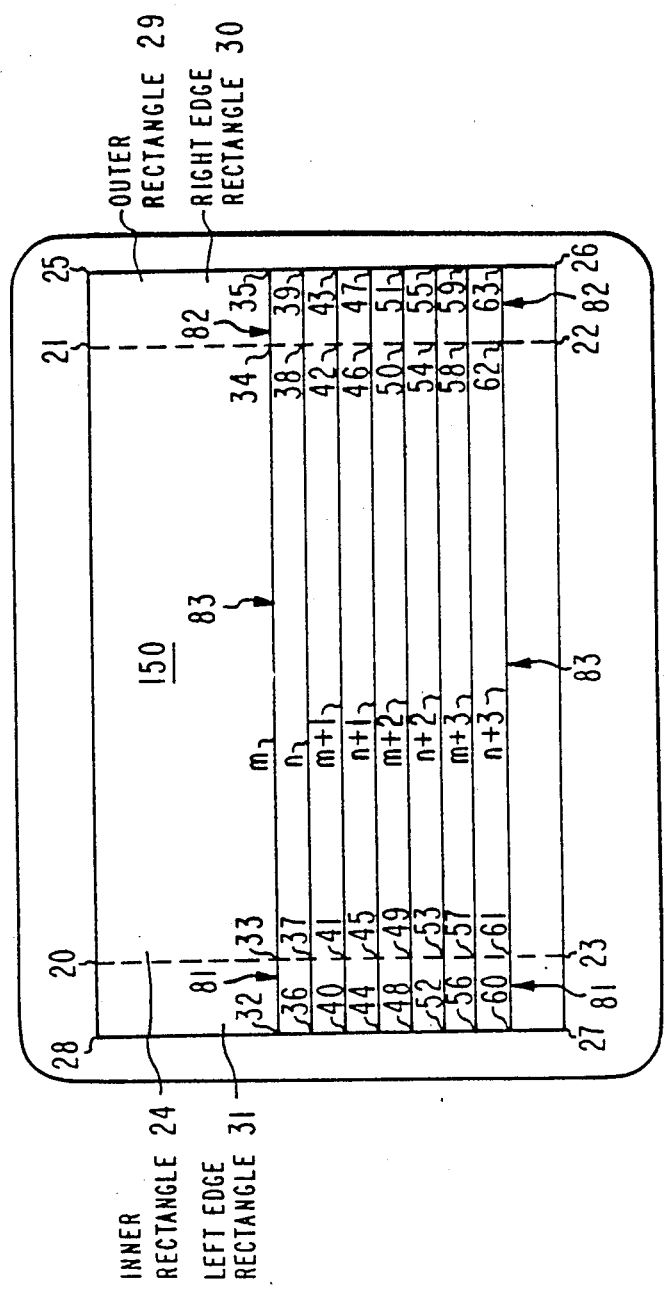
FIG. 1 illustrates one example of an image area having an extended aspect ratio.

FIG. 1 illustrates one example of an image area 150 having an extended aspect ratio. It may represent a display image area such as that of a cathode ray tube for displaying a picture having extended aspect ratio picture; alternatively, it may represent a television camera image area having extended aspect ratio. In FIG. 1, an inner rectangle 24 defines an area having a conventional 4:3 aspect ratio. Inner rectangle 24 is defined by its corners 20, 21, 22 and 23. An outer rectangle 29 of FIG. 1, defined by its corners 25, 26, 27 and 28, encompasses an area having an extended aspect ratio. The heights of inner rectangle 24 and outer rectangle 29 are equal to the length of a line formed by connecting corner 21 and corner 22. Corners 21, 25, 26 and 22 define a right edge rectangle 30; similarly, corners 20, 23, 27 and 28 define a left edge rectangle 31.

Lines m, n, m+1, n+1, m+2, n+2, m+3 and n+3 may represent examples of scan lines, or more generally, display lines, of an image of a receiver diaplay or a television camera. These scan lines start at point 32, 36, 40, 44, 48, 52, 56 and 60, respectively, in FIG. 1. These scan lines intersect with an interior vertical line of left edge rectangle 31 at points 33, 37, 41, 45, 49, 53, 57 and 61, respectively; and with an inward vertical line of right edge rectangle 29 at points 34, 38, 42, 46, 50, 54, 58 and 62 respectively.

In one embodiment of the invention in which an interlace system is used, scan lines m, m+1, m+2 and m+3 may illustrate four consecutively scanned lines of a first field of a picture frame; whereas, lines n, n+1, n+2 and n+3 may illustrate four consecutively scan lines of a second field of a picture frame.

Figure 9:
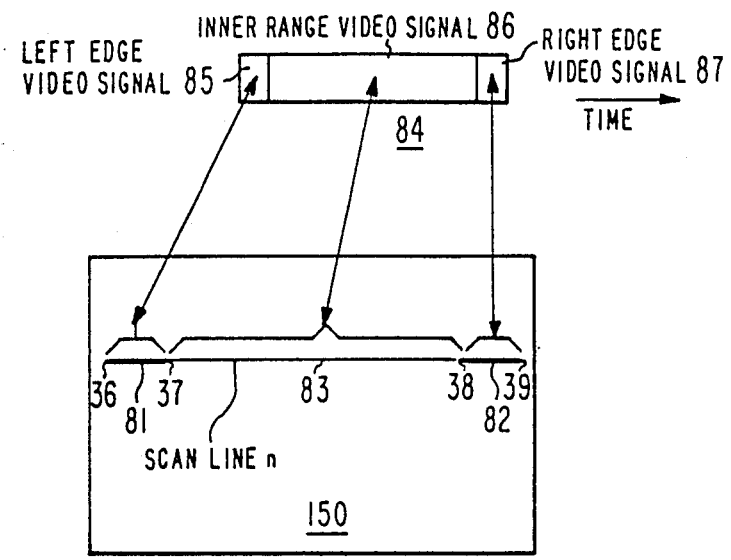
FIG. 9 illustrates the image area of FIG. 1 and the timing diagram of a television signal generated by a television camera or provided to the image area of FIG. 1.

A scan line, such as scan line n of FIG. 1, illustrated by itself in FIG. 9 comprises an inner range 83, and an outer range located inside and outside, respectively, of inner rectangle 24 of FIG. 1. The outer range includes a left edge 81 and a right edge 82 located in right edge rectangle 30 and left edge rectangle 31, respectively, of FIG. 1. FIG. 9 illustrates schematically the partitioning of a video signal 84 derived from scan line n in a television transmitter, or provided to a television receiver for displaying scan line n. Video signal 84 is comprised of a left edge video signal 85, an inner range video signal 86 and a right edge video signal 87 providing picture information for left edge 81, inner range 83 and right edge 82, respectively, of scan line n of image area 150.

Figure 3:
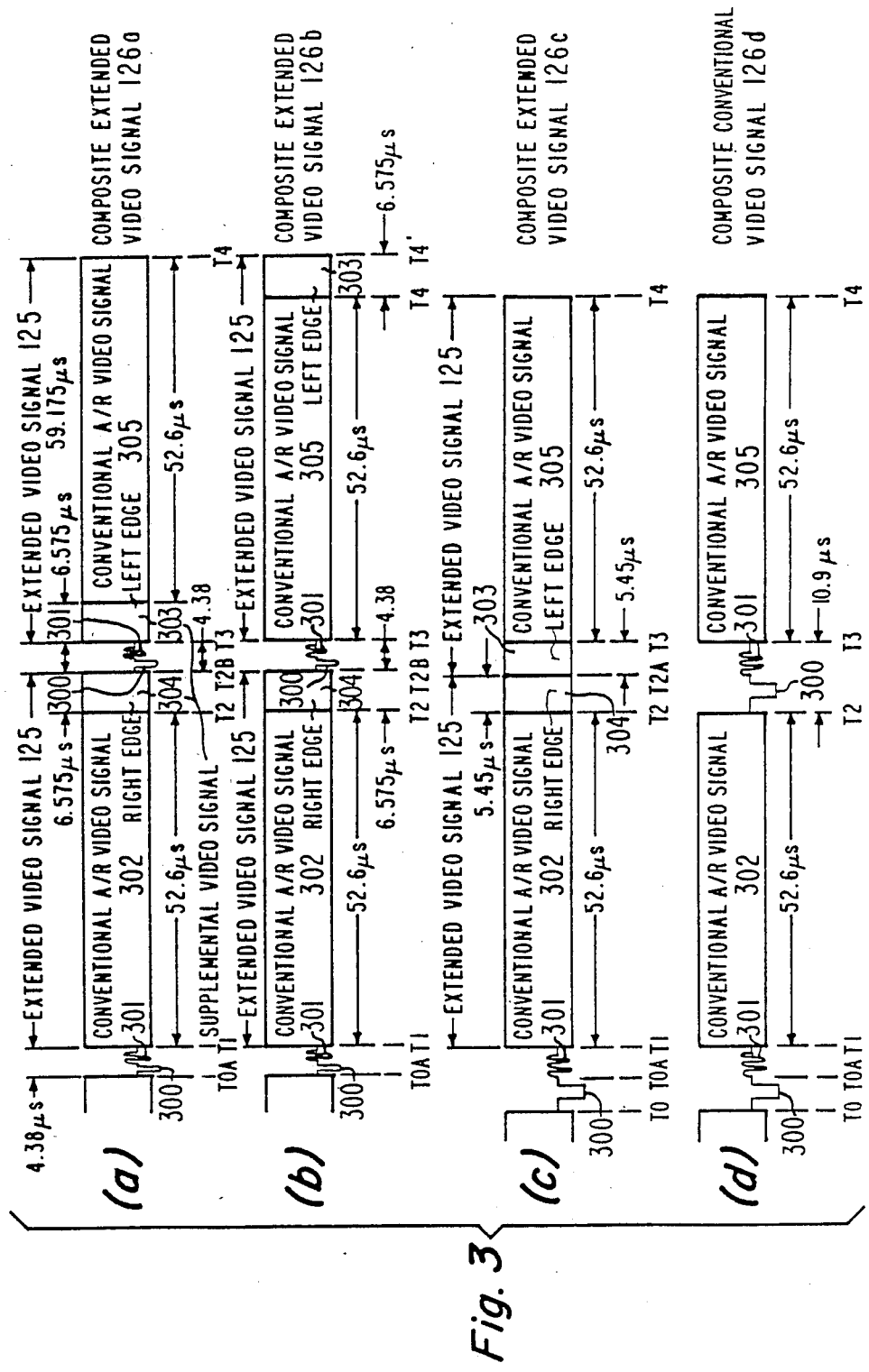
FIGS. 3a, b, c and d illustrate three timing diagrams of composite extended video signals embodying various aspects of the invention, and a composite conventional video signal, respectively.

FIG. 3d illustrates a composite conventional video signal 126d of a a pair of scan lines as defined by the NTSC standard. Signal 126d includes conventional aspect ratio video signals 302 and 305 provided from a time T1 to a time T2 and from time T3 to a time T4, respectively. A horizontal sync pulse 300 and a color burst 301 are provided in a one blanking period from a time T∅ to a time T1 and in another blanking period from a time T2 to a time T3.

Each of FIGS. 3a, 3b and 3c illustrates examples of composite extended video signals 126a, b and c embodying the invention which are suitable for providing picture information of a given pair of scan lines such as scan lines n and n+1 on image area 150 of FIG. 1. The format for the pair may repeat in subsequent pairs of scan lines; therefore, a detailed description of one pair is adequate for characterizing all the scan lines of image area 150. Identical number and names in FIGS. 3a–d indicate the same function or item. In systems which do not employ edge compression processing as described later on, composite extended video signals 126a, b and c of FIGS. 3a, b and c may provide 5:3, 5:3 and 4.8:3 aspect ratio pictures, respectively.

In FIG. 3a, a time T∅A indicates one end time of composite extended video signal 126a of a pair of scan lines. A horizontal sync pulse 300 followed by a color burst signal 301 are provided in a time slot of illustratively 4.38 microseconds between time T∅A and a time T1. A conventional aspect ratio video signal 302 providing picture information of the inner range of scan line n of FIG. 1 is provided in a time slot of illustratively 52.6 microseconds between time T1 and a time T2. A supplemental video signal 304 providing picture information of the right edge of scan line n of FIG. 1 is provided in a time slot of illustratively 6.575 microseconds between time T2 and a time T2B. A horizontal sync pulse 300 followed by a color burst signal 301 are provided in a time slot of illustratively 4.38 microseconds between time T2A and a time T3. A supplemental video signal 303 providing picture information of the left edge of scan line n+1 of FIG. 1 is provided in a time slot of illustratively 6.575 microseconds between time T3 and a time T3A. A conventional aspect ratio video signal 305 providing picture information of the inner range of scan line n+1 of FIG. 1 is provided in a time slot of illustratively 52.6 microseconds between time T3A and a time T2A', the other end time of the pair.

In an alternative embodiment of a composite extended video signl 126b of FIG. 3b, a time T∅A indicates one end time of a pair of scan lines. A horizontal sync pulse 300 followed by a color burst signal 301 are provided in a time slot of illustratively 4.38 microseconds between time T∅ and a time T1. A conventional aspect ratio video signal 302 providing picture information of the inner range of scan line n of FIG. 1 is provided in a time slot of illustratively 52.6 microseconds between time T1 and a time T2. A supplemental video signal 304 providing picture information of the right edge of scan line n of FIG. 1 is provided in a time slot of illustratively 6.575 microseconds between time T2 and a time T2B. A horizontal sync pulse 300 followed by a color burst signal 301 are provided in a time slot if illustratively 4.38 microseconds between time T2B and a time T3. A conventional aspect ratio video signal 305 providing picture information of the inner range of scan line n+1 of FIG. 1 is provided in a time slot of illustratively 52.6 microseconds between time T3 and a time T4. A supplemental video signal 303 providing picture information of the left edge of scan line n+1 of FIG. 1 is provided in a time slot of illustratively 6.575 microseconds between time T4 and a time T4', the other end time of the pair.

In an alternative embodiment of signal 126c illustrated in FIG. 3c, a time T∅ indicates one end time of a pair of scan lines. A horizontal sync pulse 300 followed by a color burst signal 301 are provided in a time slot of illustratively 10.9 microseconds between time T∅ and a time T1. This time slot may be equal to the blanking time in the NTSC system. A conventional aspect ratio video signal 302 providing picture information of the inner range of scan line n of FIG. 1 is provided in a time slot of illustratively 52.6 microseconds between time T1 and a time T2. A supplemental video signal 304 providing picture information of the right edge of scan line n followed by a supplemental video signal 303 providing picture information of the left edge of scan line n+1 are provided in time slots of equal length from time T2 to a time T2A and from time T2A and a time T3, respectively. No additional information is provided in the interval T2-T3. The time period between time T2 and T3 may correspond to the blanking period in the NTSC system. A conventional aspect ratio video signal 305 providing picture information of the inner range of scan line n+1 of FIG. 1 is provided in a time slot of illustratively 52.6 microseconds from time T3 to a time T4, the other end time of the pair. Thus, composite extended video signal 126c may differ from the composite video signal of the NTSC system in that a selected number of time slots in the blanking period of the NTSC signal may, such as every other time slot, be utilized for providing the supplemental video signal.

In accordance with an aspect of the invention, a portion of composite extended video signal 126a, b or c of FIGS. 3a-3c comprising extended video signal 125 provides only picture information without synchronization information. The picture information may be that of a picture having extended aspect ratio. Extended video signal 125 includes conventional aspect ratio video signal 302 or 305 and supplemental video signal 303 or 304 in separate time slots.

The conventional aspect ratio video signal 302 or 305 part of extended video signal 125 of FIGS. 3a-3c may have the functions, characteristics, structure and bandwidth of composite conventional video signal 126d of FIG. 3d outside the blanking period. Thus, conventional aspect ratio video signal 303 or 305, may provide picture information of a picture having a conventional aspect ratio.

Figure 10:
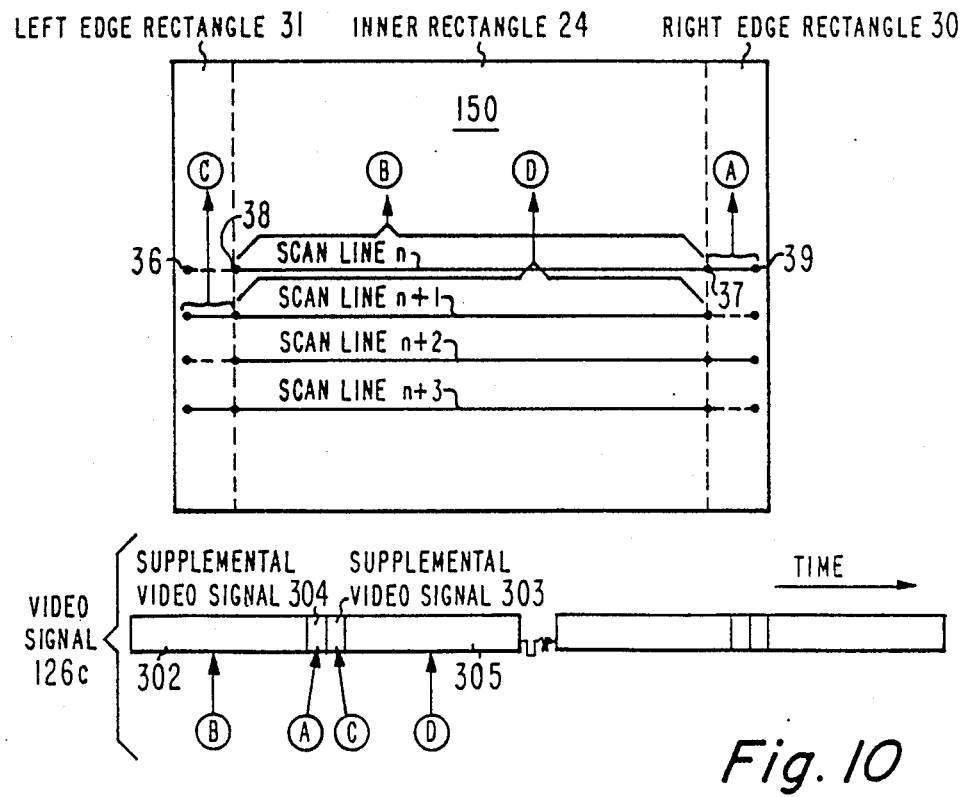
FIG. 10 illustrates the timing diagram of composite extended video signal of FIG. 3c and also the image area of FIG. 1.

FIG. 10 illustrates image are 15 of FIG. 1 and composite extended video signal 126c of FIG. 3c associated with scan line n and n+1 illustrated in FIG. 1. Identical numbers and symbols in the figures identify similar functions or items. Supplemental video signals 304 and 303 of FIG. 3c provide picture information for the outer range of scan lines n and n+1, respectively, as illustrated in FIG. 10. For example, scan line n between points 38 and 39 is associated with supplemental video signal 304 of line n. Conversely, scan line n between points 36 and 37 is not associated with a supplemental video signal; however, in the television receiver, a filling video signal is constructed to provide picture information between points 36 and 37, as described later one.

Conventional aspect video signal 302 of FIGS. 10 and 3c provides picture information for scan line n between points 37 and 38 as illustrated in FIG. 10. Since scan line n between points 37 and 38 touches the boundaries of inner rectangle 24 having conventional aspect ratio, it follows that conventional aspect ratio video 302 provides picture information for a portion of image area 150 having conventional aspect ratio.

Composite extended video signals 126a and b of FIGS. 3a and b provide the same type of video information as provided by signal 126c of FIG. 3c but use slightly different formats.

In accordance with another aspect of the invention, supplemental video signals 304 and 303 of FIG. 3c provide picture information for only a portion of the outer range of a scan line. More specifically, supplemental video signals 304 and 303 provide picture information for alternate left and right edges of consecutive scan lines in the same field as illustrated in FIG. 10.

For the embodiment of FIG. 3c, the number of scan lines provided with video information in right edge rectangle 30 of FIG. 10, for example, are reduced by a factor of 2 relative to the number of scan lines provided with video information in inner rectangle 24 of FIG. 10. The reduced number of scan lines may cause an increase in the effect of artifacts in right edge rectangle 30 relative to the effect of artifacts in inner rectangle 24, where all the scan lines are provided with video signal. To reduce the effect of such artifacts, in accordance with one aspect of the invention, supplemental video signal 303 or 304 provides reduced picture resoltion in relation to that provided by conventional aspect ratio video signal 302 or 305, as explained in detail later on.

Figure 2A:
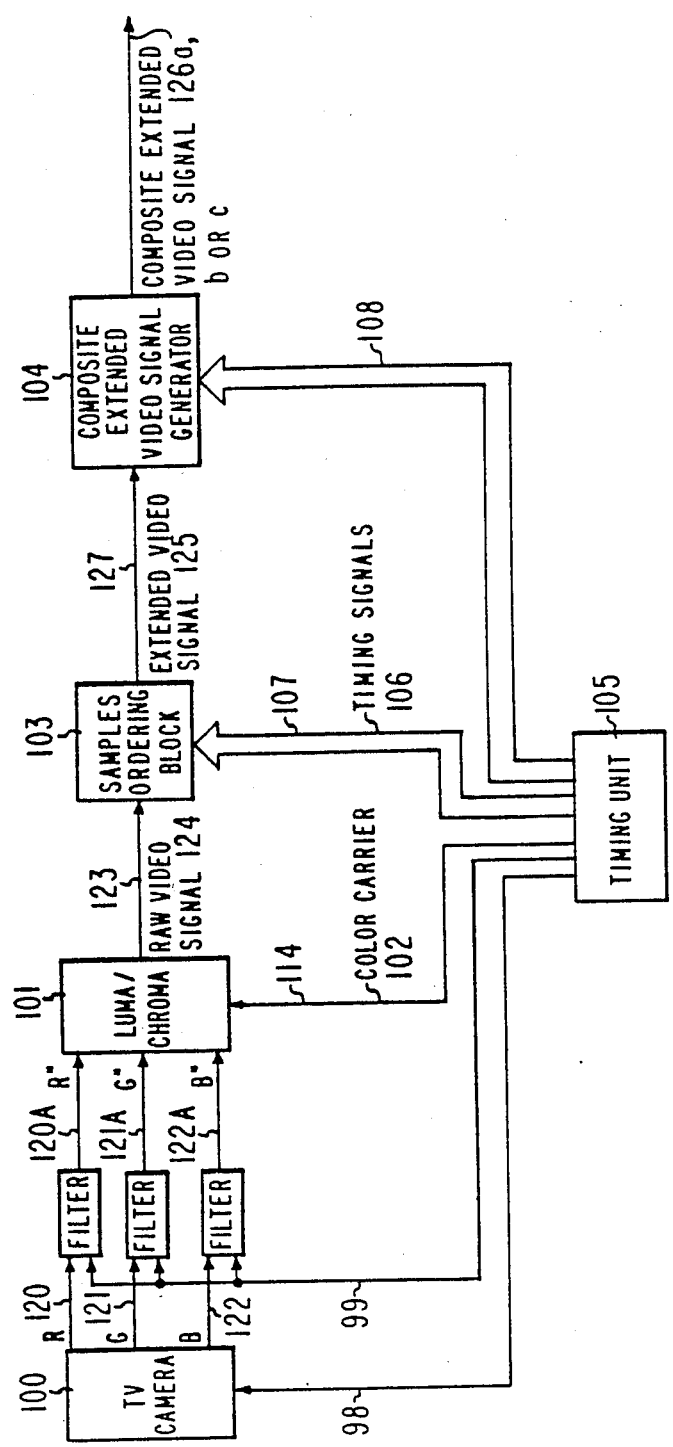
FIGS. 2a and 2b illustrate two systems embodying the invention for generating and receiving a composite extended video signal, respectively.

FIG. 2a illustrates a system embodying the invention for generating a given one of the embodiments of composite extended video signal 126a, b or c of the invention. In FIG. 2a, a television camera 100, controlled by timing signals 98 of a timing unit 105, provides color signals R, G, B, on lines 120, 121 and 122, coupled, preferably, to filters 109, 110 and 111, respectively. Filters 109-111 provide color signals R",G",B" on lines 120A, 121A and 122A, respectively to a luma/chroma modulator 101. Television camera 100 scans the entire image area 150 of FIG. 1. Filters 109-111 reduce the vertical resolution provided by supplemental video signal 303 and 304, but not that provided by conventional aspect ratio video signal 302 or 305 of FIGS. 3a-c, for the purpose of reducing the effect of artifacts in left edge rectangle 31 and in right edge rectangle 30 of FIG. 1.

Figure 14:
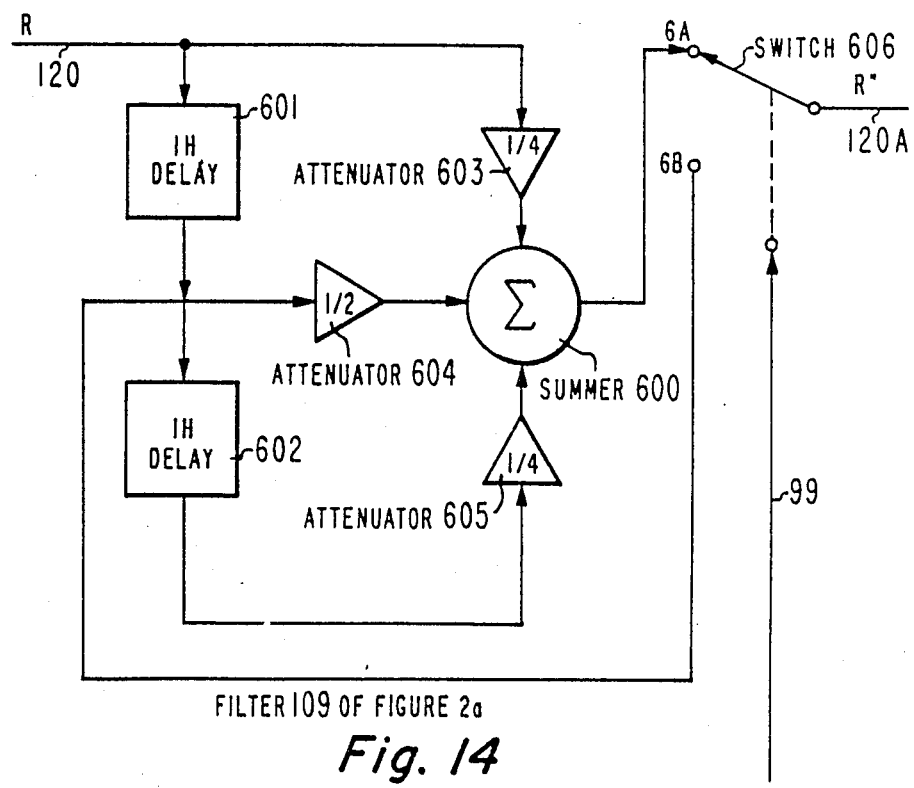

FIG. 14 illustrates filter 109 of FIG. 2a; filters 110-111 may be of a similar construction. Identical numbers or numbers in FIGS. 14 and 2a indicate similar functions or items. FIG. 15a illustrates schematically the timings diagrams for R signal of filter 109. FIG. 15b illustrates the timing diagram of R" signal. A left edge signal 89 of R signal, illustrated in FIG. 15a, delayed by 1H delays 601 and 602, each providing a scan line time delay, and attenuated by a factor of 4 of an attenuator 605 is provided to a summer 600. A left edge signal 90 of R signal, illustrated in FIG. 15a, delayed by 1H delay 601 and attenuated by a factor of 2 of an attenuator 604 is provided also to summer 600. A left edge signal 91 of R signal, illustrated in FIG. 15a, attenuated by a factor of 4 of an attenuator 603 is also provided to summer 600. Summer 600 adds all the provided signals and supplies a left edge signal 95 of R'' on a line 120A, as illustrated in FIG. 15b, through a position 6A of a switch 606. Switch 606 is controlled by a timing signal 99 of timing unit 105. Similarly, a right edge signal 97 of R'' signal is obtained from right edge video signals 92, 93 and 94 of R signal at the appropriate times.

An inner range signal 88 of R signal of scan line n+1 delayed by 1H delay 601 provides inner range signal 96 of R'' signal, as illustrated in FIG. 15b, to a position 6B of switch 606. Thus, left edge signal 95 or right edge signal 97 of R'' signal provides a filtered or averaged value of the left edge signal of scan lines n through n+2; whereas, inner range signal 96 of R'' signal provides the same picture information as that of the respective portion of R signal.

Luma/chroma modulator 101 of FIG. 2a, of a conventional design to produce an NTSC format output signal receives R'', G'', B'' signals and also receives a luma/chroma color sub-carrier signal 102 on a line 114 from timing unit 105, as detailed later on. A raw video signal 124 of NTSC format is provided to a samples ordering block 103 on a line 123 by luma/chroma modulator 101.

Samples ordering block 103 receives timing signals 106 on lines 107 and provides extended video signal 125 of an embodiment illustrated in FIG. 3a, 3b or 3c along a line 127 to a composite extended video signal generator 104.

Composite extended video signal generator 104 may be of a conventional design and may include sync inserter and color burst inserter stages for combining extended video signal 125 with a horizontal sync timing pulse and a color burst signal, obtained from a timing unit 105 along lines 108 of FIG. 2a for generating the complete composite extended video signal 126a, b or c of FIGS. 3a–3c, respectively.

Figure 4:
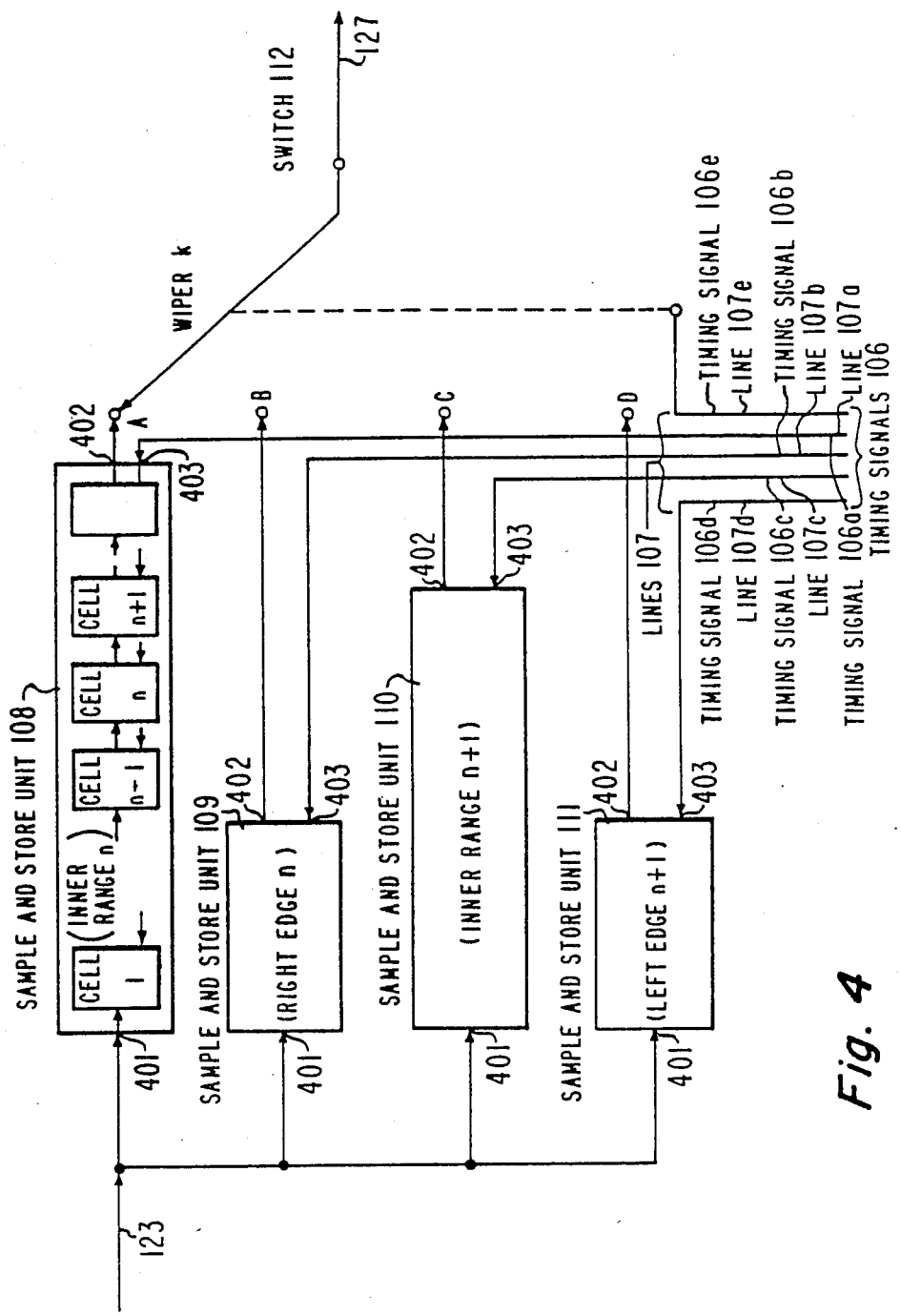
FIG. 4 illustrates a detailed embodiment of the samples ordering block of the systems of FIGS. 2a and 2b.
Figure 5:
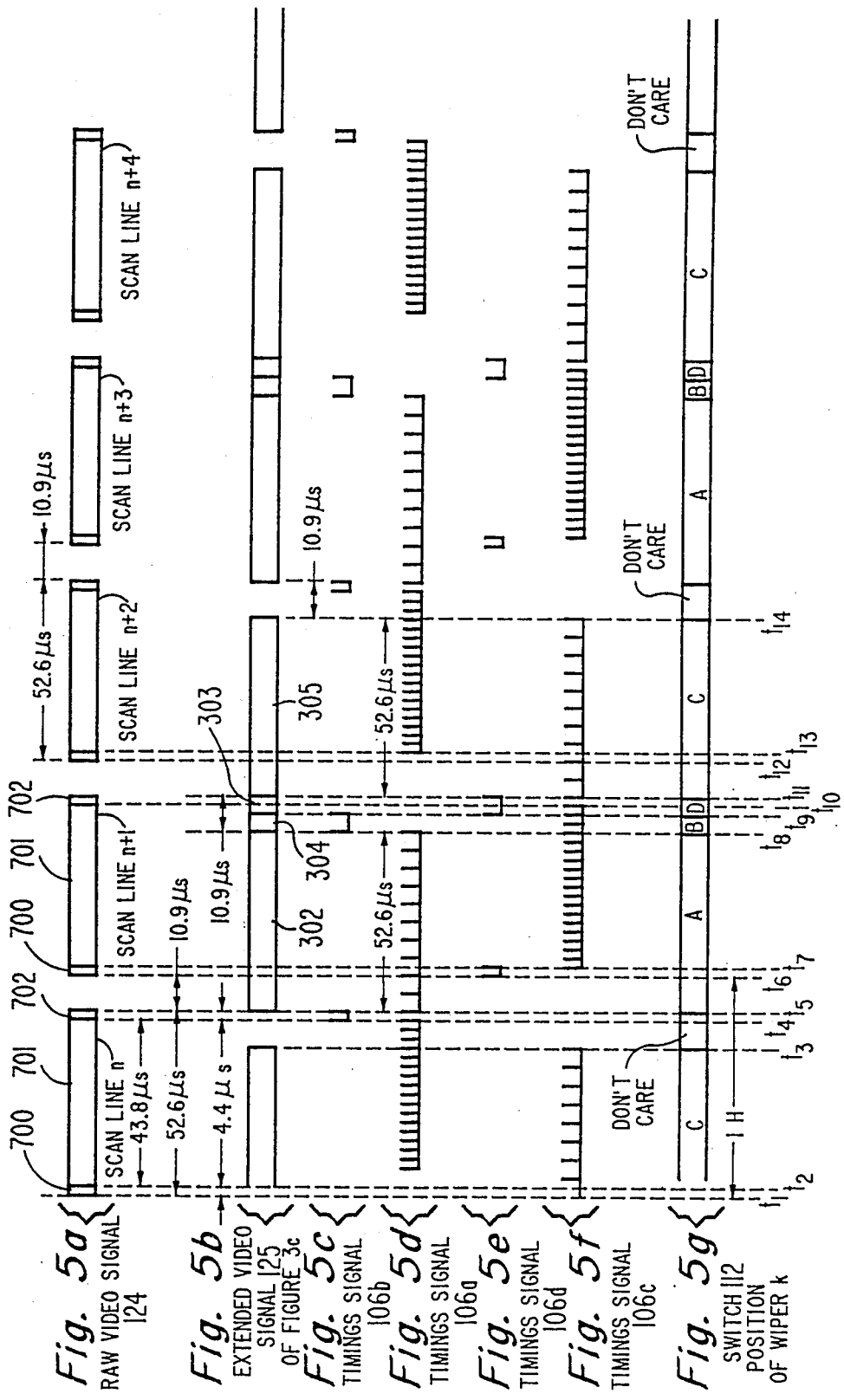

FIG. 4 illustrates samples ordering block 103 of FIG. 2a. Identical numbers and symbols in FIGS. 4 and 2a indicate similar items or functions. FIG. 5a illustrates timings diagram of raw video signal 124 for scan lines n through n+4. In FIG. 5a, raw video signal 124 includes a left edge video signal 700, an inner range video signal 701 and a right edge video signal 702 providing luminance and chrominance picture information for left edge 81, inner range 83 and right edge 82 of signal 84, illustrated in FIG. 9, respectively. As in a composite conventional aspect ratio video signal in an NTSC format, for example, the color information is carried in chroma modulated color subcarrier.

Samples ordering block 103 of FIG. 4 includes sample and store units 108 and 109 for sampling and storing inner range video signal 701 and right edge video signal 702 of scan line n, respectively, and sample and store units 110 and 111 for sampling and storing inner range video signal 701 and left edge video signal 700 of the subsequent scan line, scan line n+1, respectively. Each of units 108–111 has an input terminal 401 receiving the signal on line 123 and an output terminal 402 coupled to positions A, B, C and D, respectively of a switch 112. A wiper k of switch 112 selectively couples positions A, B, C or D to line 127 to provide extended video signal 125 of an embodiment illustrated in FIGS. 3a, 3b or 3c. Timing signals 106 of FIG. 2a comprise timing signals 106a, b, c, d and e of FIG. 4 on lines 107a, b, c, d and e respectively of lines 107 of FIG. 2a. Timing signal 106e controls the position of wiper k of switch 112. Each of timing signals 106a, b, c and d coupled to a terminal 403 of units 108, 109, 110, and 111, respectively, provides a series of timing commands. Each timing command provides simultaneously, a sampling command and a read out command, as explained later on. Each of sample and store unit 108, 109, 110 and 111 comprises a plurality of storage cells coupled in a chain-like arrangement. Each cell has an input and an output terminal. The input terminal of one cell is coupled to the output terminal of the preceding cell. The input terminal of the first cell in the chain is coupled to input terminal 401, and the output terminal of the last cell in the chain is coupled to output terminal 402. FIG. 4 illustrates the coupling of cell n−1, cell n and cell n+1 of sample and store unit 108.

The occurrence of a sampling command of timing signal 106a, b, c or d, causes the value of a sample stored in a storage cell to be transferred to the subsequent storage cell in the chain in a way similar to the operation of a shift register. Thus, after the occurrence of a sampling command, a sample of raw video signal 124, illustrated in FIG. 2a, is stored in the first cell, and the velue of the sample in the storage cell preceding the last storage cell in the chain is stored in the last storage cell and provided to output terminal 402. Thus, a sampling command also provides a read out command. The number of sampling commands required to transfer a value of raw video signal 124 of FIG. 2a from input terminal 401 to output terminal 402 is equal to the number of storage cells in the chain-like arrangement of the respective sample and store unit 108, 109, 110 and 111.

Each of sample and store units 108, 109, 110 and 111 operates in two modes: a sampling and storing mode, and a read out mode. In the sampling and storing mode a signal at input terminal 401 of the respective unit is sampled by the corresponding timing signal and the samples are stored in the storage cells sequentially. In the read out mode, all the samples stored in the storage cells during the sampling and storing mode time are read out sequentially.

In the sampling and storing mode of samples ordering block 103 of FIG. 2a, sample and store units 108, 109, 110 and 111, sample and store sequential samples of, respectively, the entire inner range video signal 701 of scan line n, right edge video signal 701 of scan line n, left edge video signal 700 of scan line n+1 and inner range video signal 701 of scan line n+1, all illustrated in FIG. 5a.

FIGS. 5b–5g illustrate the timing diagrams for sample and store block 103 of FIG. 4 incorporated into the system of FIG. 2a for obtaining raw video signal 125 for the embodiment of FIGS. 3c and FIG. 5b. The short vertical lines in FIGS. 5c, 5d, 5e and 5f illustrate schematically sampling and read out commands provided by timing signals 106b, 106a, 106d and 106c, respectively.

In the sampling and storing mode of units 108 and 109, timing signals 106a and 106b provide sampling commands for sampling inner range video signal 701 and right edge video signal 702 of FIG. 5a, respectively, from time t2 to time t4 and from time t4 to time t5, respectively, as illustrated in FIGS. 5d and 5c, respectively.

From time t5 to time t8, all the samples stored in the sampling and storing mode in unit 108 are read out sequentially by timing signal 106a. During this read out mode time, wiper k at position A of switch 112, as illustrated schematically in FIG. 5g, provides conventional aspect ratio video signal 302, as illustrated schematically in FIG. 5b.

All the samples stored in the sampling and storing mode in unit 109 are read out sequentially by timing signal 106b between time t8 and time t9. During this read out mode, wiper k at position B provides supplemental video signal 304 as illustrated in FIG. 5b.

In the sampling and storing mode of units 111 and 110, timings signals 106d and 106c provide sampling commands for sampling left edge video signal 700 and inner range video signal 701 of FIG. 5a, from time t6 to time t7 and from time t7 to time t10, respectively, as illustrated in FIGS. 5e and 5f, respectively.

From time t9 to time t11, all the samples stored in the sampling and storing mode in unit 111 are read out by timing signal 106d. During this read out mode time, wiper k at position D of switch 112, as illustrated schematically in FIG. 5g, provides supplemental video signal 303 as illustrated schematically in FIG. 5b.

All the samples stored in unit 110 in the sampling and storing mode are read out sequentially by timing signal 106c between time t11 and time t14. During this read out mode time, wiper k at position C of switch 112 illustrated schematically in FIG. 5g provides conventional aspect ratio video signal 301 as illustrated schematically in FIG. 5b.

Figure 6:
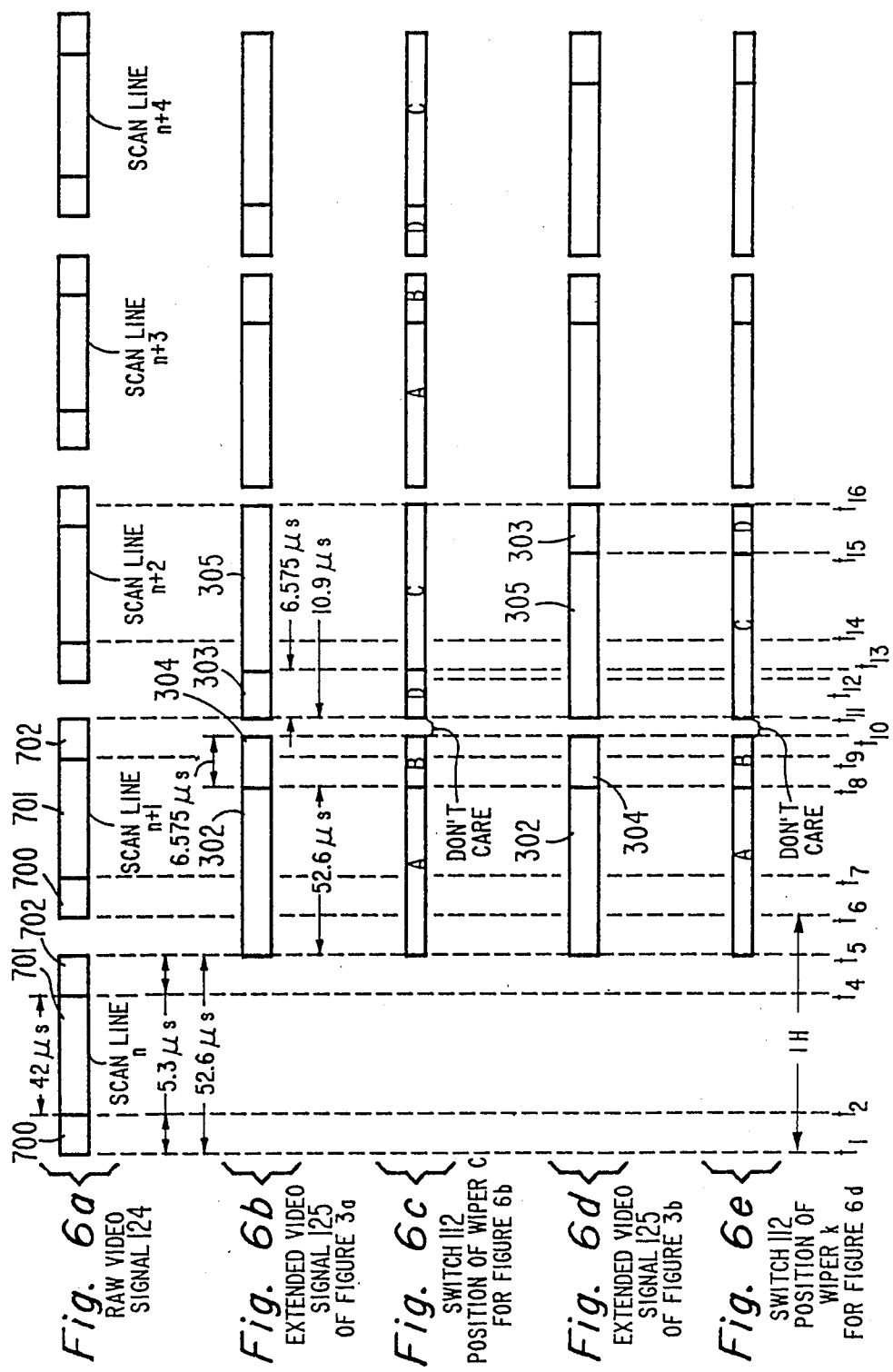

FIG. 6a illustrates timing diagrams associated with the developing of composite extended video signal 126a or 126b of FIG. 3a or 3b from raw video signal 124. The timing diagram of FIG. 6a is analogous to that of FIG. 5a. Identical numbers and symbols of FIGS. 5a and 6a indicate similar functions or items.

FIGS. 6b and 6d illustrate timing diagrams of extended video signal 125 of FIGS. 3a and 3b, respectively. The timing diagrams of FIGS. 6b and 6d are analogous to that of FIG. 5b. FIGS. 6c and 6e schematically illustrate timing diagrams illustrating the positions of switch 112 of FIG. 4 for the embodiments of FIGS. 6b and 6d, respectively. The timing diagrams of FIGS. 6c and 6e are analogous to that of FIG. 5g.

The generation of the signals of FIG. 6b is now discussed. In the sampling and storing mode of units 108 and 109 of FIG. 4, timing signals 106a and 106b provide sampling commands for sampling inner range video signal 701 and right edge video signal 702 of FIG. 6a from time t2 to time t4 and from time t4 to time t5, respectively.

From time t5 to time t8, all the samples stored in unit 108 are read out sequentially by timing signal 106a. During this read out mode time, wiper k, at position A of switch 112, as illustrated in FIG. 6c, provides conventional aspect ratio video signal 302, as illustrated in FIG. 6b and in the corresponding portion of FIG. 3a.

All the samples stored in unit 109 are read out sequentially by timing signal 106b between time t8 and time t10A. During this read out mode, wiper k, at position B, as illustrated in FIG. 6c, provides supplemental video signal 304 as illustrated in FIG. 3a.

In the sampling and storing mode of units 110 and 111 timing signals 106d and 106c provide sampling commands for left edge video signal 700 and inner range video signal 701 of FIG. 6b from time t6 to time t7 and from time t7 to time t10, respectively.

From time t11 to time t13, all the samples stored in units 111 are read out sequentially by timing signals 106d. During this read out mode, wiper k, at position D of switch 112, as illustrated schematically in FIG. 6c, provides supplemental video signal 303 as illustrated in FIG. 6b.

All the samples stored in unit 110 are read out sequentially by timing signal 106c from time t13 to time t16. During this read out mode time, wiper k, at position C of switch 112, as illustrated schematically in FIG. 6c, provides conventional aspect ratio video signal 305 as illustrated in FIG. 6b.

The generation of the signal of FIGS. 6d and the corresponding portions of FIG. 3b is similar to that of the signal of FIG. 6b discussed above, except that the read out of conventional aspect ratio video signal 305 of FIGS. 6d and 3b occurs from time t11 to time t15 while switch 112 is at position C, as illustrated in FIG. 6e and except that the read out of supplemental video signal 303 occurs from time t15 to time t16 while switch 112 is at position D, as illustrated in FIG. 6e.

The next pair of scan lines n+2 and n+3 of FIG. 5a or 6a are processed by sample and store unit 103 of FIGS. 2a and 4 in a similar manner to that discussed with respect to scan lines n and n+1.

The duration t2-t4 of inner range video signal 701 of scan line n, for example, as illustrated in FIGS. 5a and 6a, is shorter than the duration t5-t8 of the corresponding conventional aspect ratio video signal 302, illustrated in FIGS. 5b, 6b and 6c. This is so because signal 701 is decompressed by samples ordering block 103 of FIG. 2a to provide the corresponding signal 302 of FIG. 5b or 6b in 52.6 microseconds time slot. Therefore, the sampling rate in the sampling mode of units 108-111 is higher than the corresponding read out rate in the read out mode. It also follows that in order to obtain the appropriate frequency of the subcarrier of the NTSC signal in signal 302 of FIG. 5b or 6b, for example, color carrier 102, provided to luma/chroma 101 of FIG. 2a, has to be of a higher frequency. The frequency of color carrier 102 should, preferably, be odd multiple of ½ of the horizontal scanning frequency, as in the NTSC signal.

Composite extended video signal 126a, b or c of FIG. 2a may modulate a carrier signal for subsequent transmission to a television receiver through a suitable transmission medium such as cable or broadcast. In a conventional manner, the front end circuits of the television receiver remove the carrier signal and develop a baseband video signal substantially similar to the corresponding composite extended video signal 126a, b or c of FIG. 3a-3c. This baseband video signal is coupled to a receiver signal processing system illustrated in FIG. 2b, embodying another aspect of the invention.

Figure 2B:
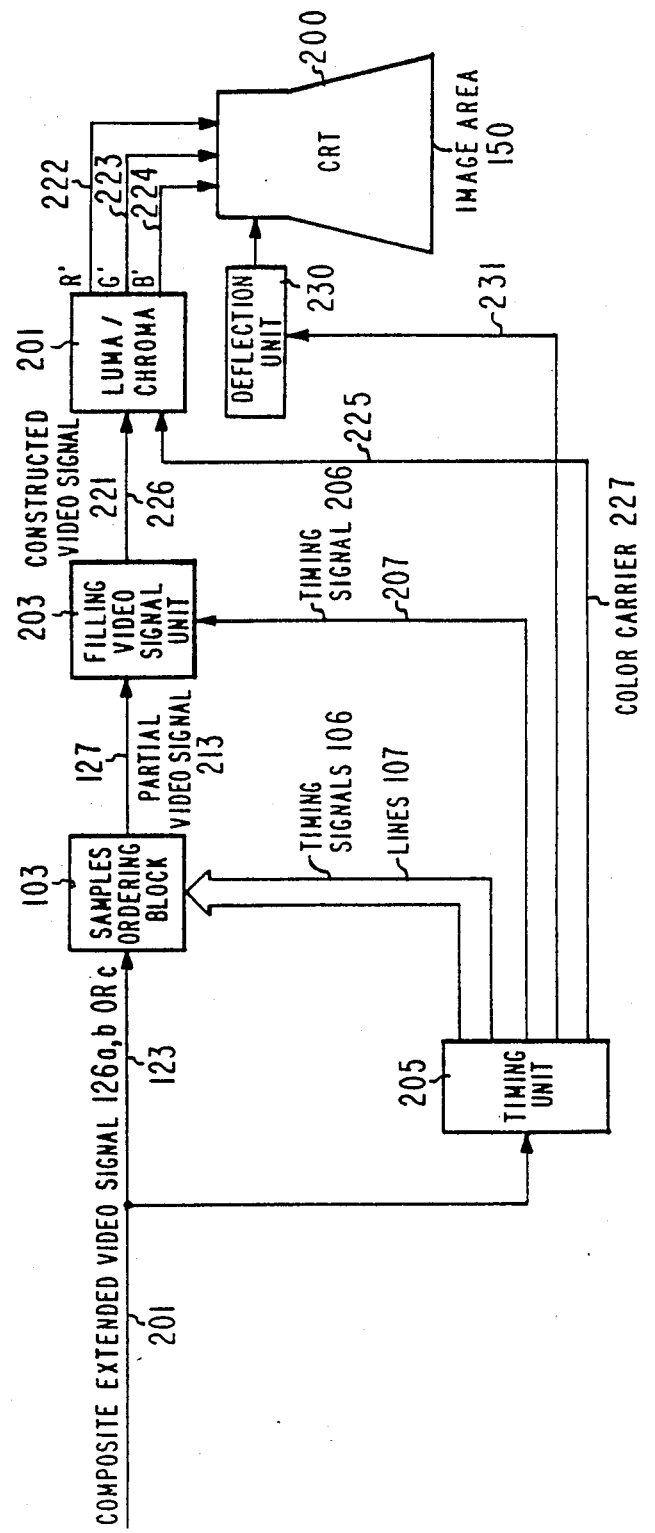

In the system of FIG. 2b, composite extended video signal 126a, b or c such as provided by the corresponding system illustrated in FIG. 2a is coupled to a timing unit 205 along a line 201. Timing unit 205 separates color burst 301 from composite extended video signal 126a, b or c. Timing unit 205 also separates scanning synchronization pulses 300 to provide deflection timing signals 232 to a deflection unit 230 of FIG. 2b. In addition, timing unit 205 provides timing signals 106 along lines 107 for controlling samples ordering block 103 of FIG. 2b. Samples ordering block 103 of FIG. 2b may be identical to that of FIG. 2a. Thus, FIG. 4 also illustrates a detailed embodiment of samples ordering block 103 of FIG. 2b.

Samples ordering block 103 of FIG. 2b receives composite video signal 126a, b or c illustrated in FIGS. 3a–3c, and receives timings signals 106 along lines 107. A partial video signal 219 along a line 127 is developed at the output of samples ordering block 103.

Figure 7:
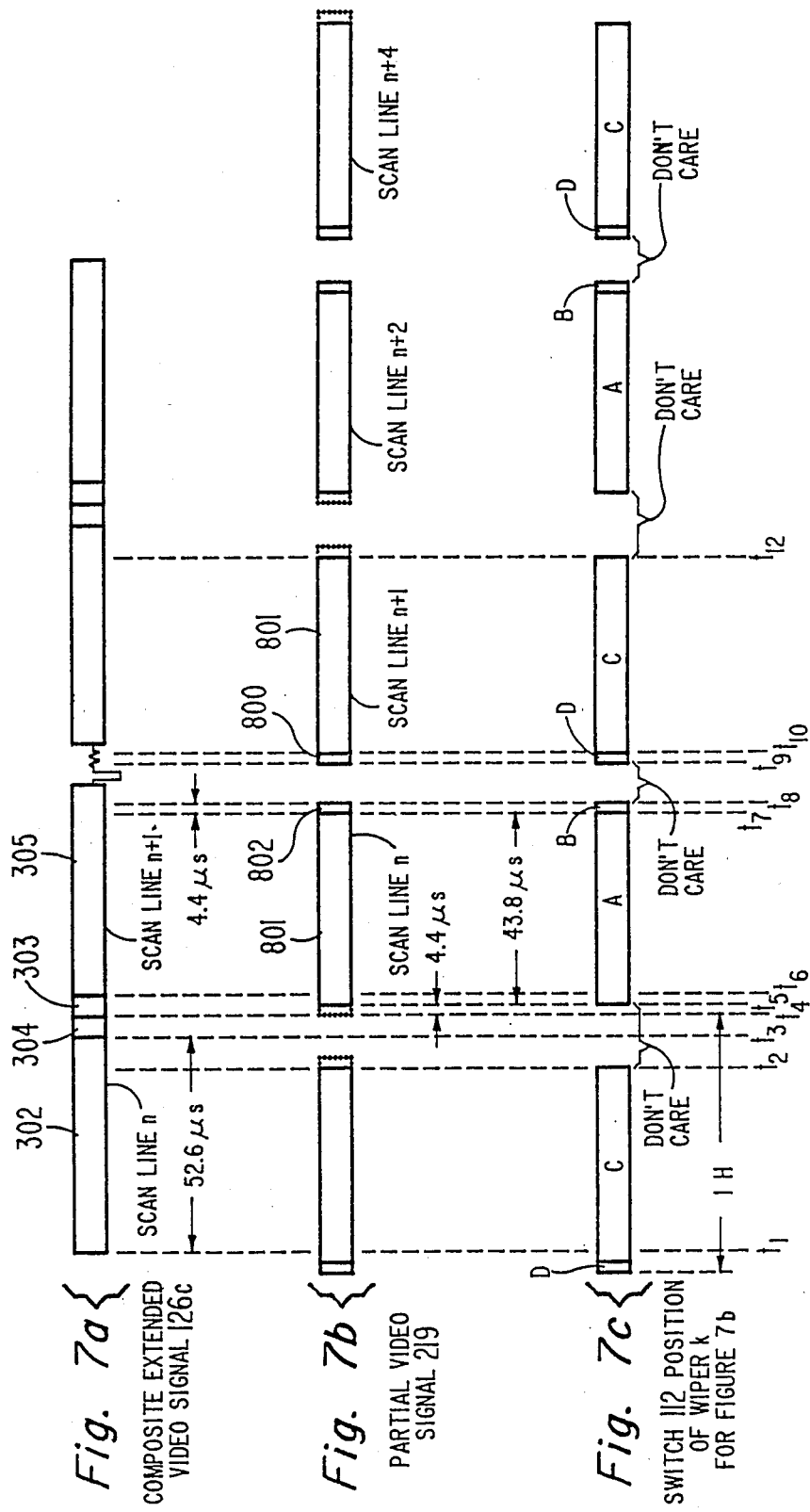
FIGS. 7a, b and c illustrate timing diagrams associated with receiving the composite extended video signal of FIG. 3c in the system of FIG. 2b.

Assume that samples ordering block 103 processes, for example, composite extended video signal 126c of FIG. 3c and FIG. 7a. FIG. 7b illustrates schematically in solid lines partial video signal 219 after composite extended video signal 126c has been processed by block 103. Partial video signal 219 has similar timings to that of raw video signal 124 of FIG. 5a except that one of its left and right edge video signals is missing. For example, scan line n of FIG. 7b includes only an inner range video signal 801 and a right edge video signal 802; whereas scan line n+1 includes only a left edge video signal 800 and an inner range video signal 801.

A filling video signal unit 203 of FIG. 2b receives partial video signal 219 and supplies the missing edge video signal to partial video signal 219, at times incorporated by the dotted line portions of the waveform of FIG. 7b. The output of filling video signal unit 203, a constructed video signal 221, illustrated in FIG. 11c is provided in a manner to be discussed in detail later on.

Figure 11:
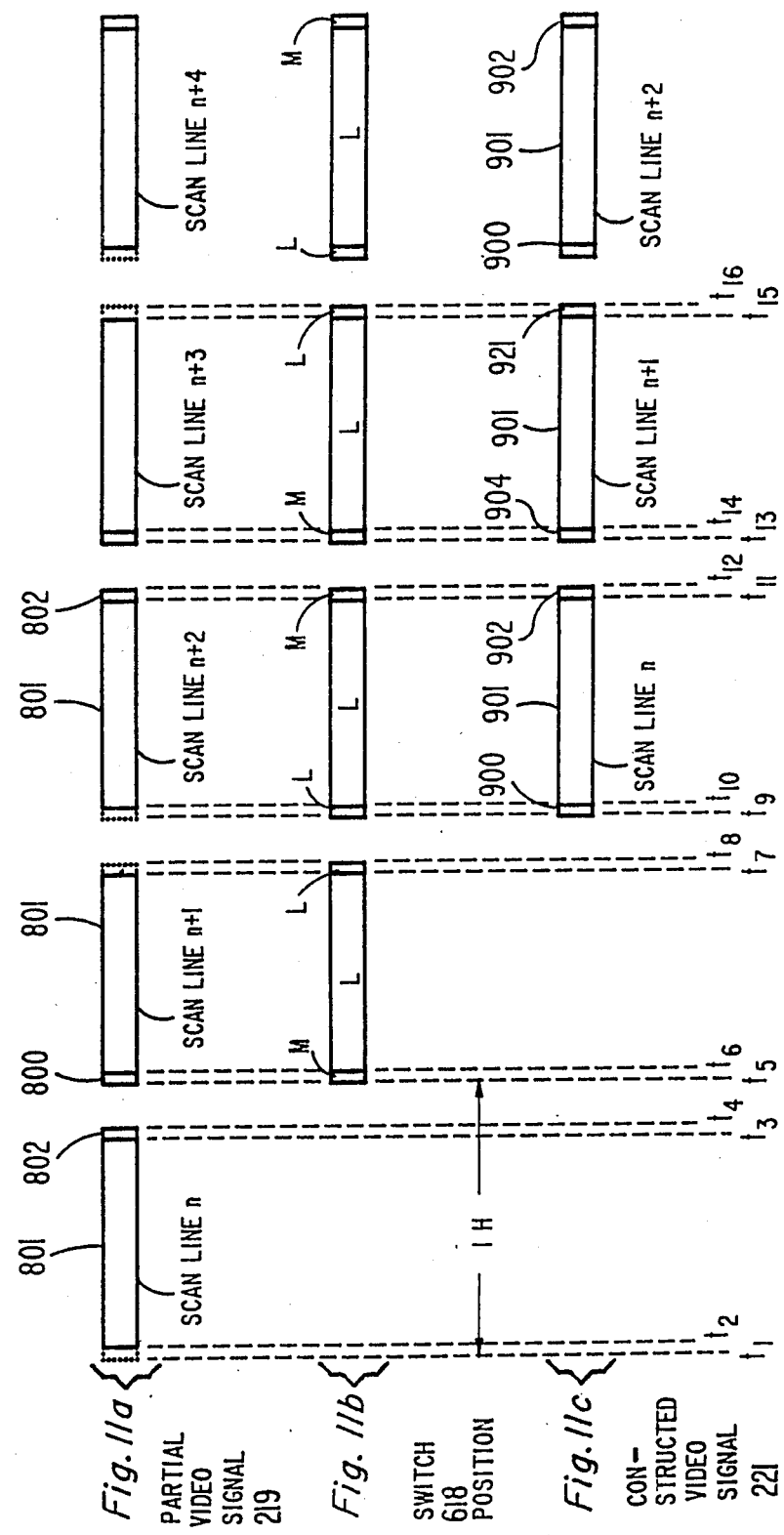
FIGS. 11a, b and c illustrate timing diagrams associated with a filling video signal unit of the system of FIG. 2b embodying one aspect of the invention.

FIG. 11c illustrates schematically an embodiment of constructed video signal 221 associated with partial video signal 219 of FIG. 7b and illustrated again in FIG. 11a. Constructed video signal 221 of scan line n, for the embodiment of FIG. 11c, comprises left edge filling video signal 900 provided by filling video signal unit 203, as discussed later on, an inner range video signal 901, and a right edge video signal 902. Inner range video signal 901 and right edge video signal 902 contain the same picture information as provided by inner range video signal 801 and right edge video signal 802 of FIG. 11a, respectively. Thus, constructed video signal 221 provides video information for left edge 81, inner range 83 and right edge 82 of scan line n of FIG. 9, respectively. Similarly, constructed video signal 221 of scan line n+1 as illustrated in FIG. 11c comprises a left edge video signal 906, an inner range video signal 901 and a right edge filling video signal 921, provides video information for the corresponding portions of scan line n+1.

A luma/chroma block 201, illustrated in FIG. 2b, of conventional construction, provides R', G' and B' color signals of extended aspect ratio to cathode ray tube 200 along lines 222, 223 and 224, respectively. It receives constructed video signal 221 and a color carrier 227 along a line 225 from timing unit 205. Color carrier 227 is discussed in more detail later on.

The generation of partial video signal 219 in samples ordering block 103 illustrated in FIG. 2b and 4 for composite extended video singla 126c of FIG. 3c and 7a is now discussed. FIG. 7c illustrates schematically a timing diagram of the position of wiper k of switch 112 of samples ordering block 103 for operating on signal 126c of FIG. 7a. Identical signal names in FIGS. 7a and 3c indicate identical signals.

In the sampling and storing mode of units 108 and 109 of FIG. 4, timing signals 106a and 106b provide sampling commands for sampling conventional aspect ratio video signal 302 and supplemental video signals 304 and 303, illustrated in FIG. 7a, respectively, from time t1 to time t3 and from time t3 to time t6 of FIG. 7e, respectively. From time t5 to time t7 all the samples stored in unit 108 are read out by read out commands of timing signal 106a. During this read out mode time, wiper k, at position A of switch 112, as illustrated in FIG. 7c, provides inner range video signal 801 as illustrated in FIG. 7b.

All the samples stored in unit 109 are read out sequentially by read out commands of timing signal 106b from time t7 to time t8. During this read out mode, wiper k at position C provides right edge video signal 802 as respectively illustrated in FIGS. 7c and 7b.

In a similar manner, in the sampling and storing mode, supplemental video signal 303 and conventional aspect ratio video signal 305 are sampled and stored in units 111 and 110, respectively. In the read out mode, all the samples of left edge video signal 800 and inner range video signal 801 of FIG. 7b are read out sequentially from sample and store units 111 and 110 respectively, while wiper k of switch 112 is at positions D and C respectively, as illustrated in FIG. 7c.

Conventional aspect ratio video signal 302 for scan line n of FIG. 7a, for example, occupies a longer time slot than the corresponding inner range video signal 801 illustrated in FIG. 7b. Therefore, the read out rate for reading all the samples of unit 108 may be faster than the sampling rate required for storing these samples.

Timing unit 205 may utilize color burst 301 to provide timings reference for obtaining color carrier 227, timing signals 106 and timing signal 206. The faster read out rate causes an increase in the frequency of the color subcarrier of inner range video signal 801. In order to match such increase in frequency, timing unit 205 may provide color carrier 227 to luma/chroma 201 of FIG. 2b at a higher frequency than that of color burst 301 of FIG. 3c. The frequency of color carrier 227 should, preferably, be an odd multiple of $\frac{1}{2}$ the horizontal scanning frequency, as in conventional NTSC receivers.

Figure 8:
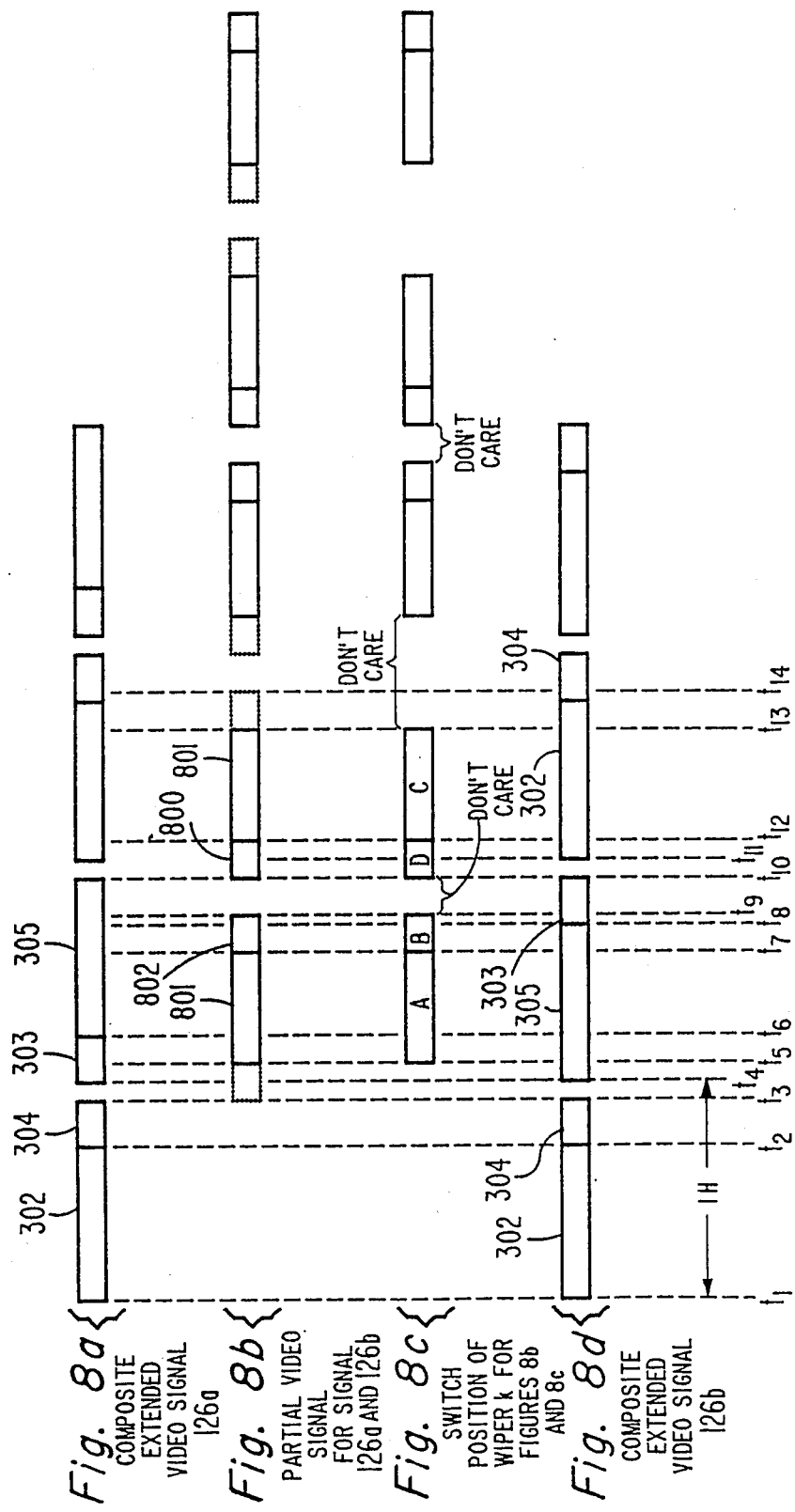
FIGS. 8a, b, c and d illustrate timing diagrams associated with receiving the composite extended video signal of FIGS. 3a and 3b in the system of FIG. 2b.

The generation of partial video signal 219 for composite extended video signal 126a of FIG. 3a is now discussed. FIG. 8a illustrates composite extended video signal 126a of FIG. 3a excluding the sync and color burst portions from the illustration. Identical signal names in FIGS. 8a and 3a indicate identical signals. FIG. 8b illustrates in solid lines partial video signal 219 for the embodiment of FIG. 8a. Identical signal names in FIGS. 7b and 8b indicate similar signals. FIG. 8c illustrates schematically timings diagram of the positions of wiper k of switch 112 of FIG. 4 for generating the signal of FIG. 8b.

In the sampling and storing mode of units 108 and 109 of FIG. 4, timing signals 106a and 106b provide sampling commands for sampling conventional aspect ratio video signal 302 and supplemental video signal 304 of FIG. 8a, respectively, from time t1 to time t2 and from time t2 to time t3, respectively. From time t5 to time t7 all the samples stored in unit 108 are read out sequentially by read out commands provided by timing signal 106a. During this read out mode time, wiper k, at position A of switch 112, as illustrated in FIG. 8c, provides inner range video signal 801 as illustrated in FIG. 8b.

All the samples stored in unit 109 are read out sequentially by read out commands of timing signal 106b from time t7 to time t9. During this read out mode time, wiper k at position B provides right edge video signal 802, as illustrated in FIG. 8b.

In a similar manner, supplemental video signal 303 and conventional aspect ratio video signal 305 are sampled in the sampling mode by sample and store unit 111 and 110, respectively. In the read out mode time, all the samples of left edge video signal 800 and inner range video signal 801 of FIG. 8b are read out sequentially from sample and store units 111 and 110, respectively, while switch 112 is at positions D and C, respectively.

The generation of partial video signal 219 for composite extended video signal 126b of FIG. 3b is now discussed. FIG. 8d illustrates composite extended video signal 126b of FIG. 3b excluding the sync and color burst portions from the illustration. Identical signal names in FIGS. 8d and 3b indicate identical signals. FIG. 8b also illustrates in solid lines partial video signal 219 for the embodiment of FIG. 8d. Identical signal names in FIGS. 7b and 8b indicate similar signals. FIG. 8c also illustrates schematically the timings diagram of the positions of wiper k of switch 112 of FIG. 4 for generating the signal of FIG. 8b.

In the sampling and storing mode of units 108 and 109 of FIG. 4, timing signals 106a and 106b provide sampling commands for sampling conventional aspect ratio video signal 302 and supplemental video signal 304 of FIG. 8d, respectively, from time t1 to time t2 and from time t2 to time t3, respectively. From time t5 to time t7 all the samples stored in unit 108 are read out sequentially by read out commands of timing signal 106a. During this read out mode time, wiper k, at position B of switch 112, as illustrated in FIG. 8c, provides inner range video signal 801 as illustrated in FIG. 8b.

All the samples stored in unit 109 are read out sequentially by read out commands of timing signal 106b from time t7 to time t9. During this read out mode, wiper k at position C provides right edge video signal 802 of FIG. 8b.

In a similar manner, conventional aspect ratio video signal 305 and supplemental video signal 303 are sampled in the sampling mode by sample and store unit 110 and 111, respectively. In the read out mode time, all the samples of left edge video signal 800 and inner range video signal 801 of FIG. 8b are read out sequentially from sample and store units 111 and 110, respectively, while wiper k of switch 112 is at positions D and C respectively.

Figure 12:
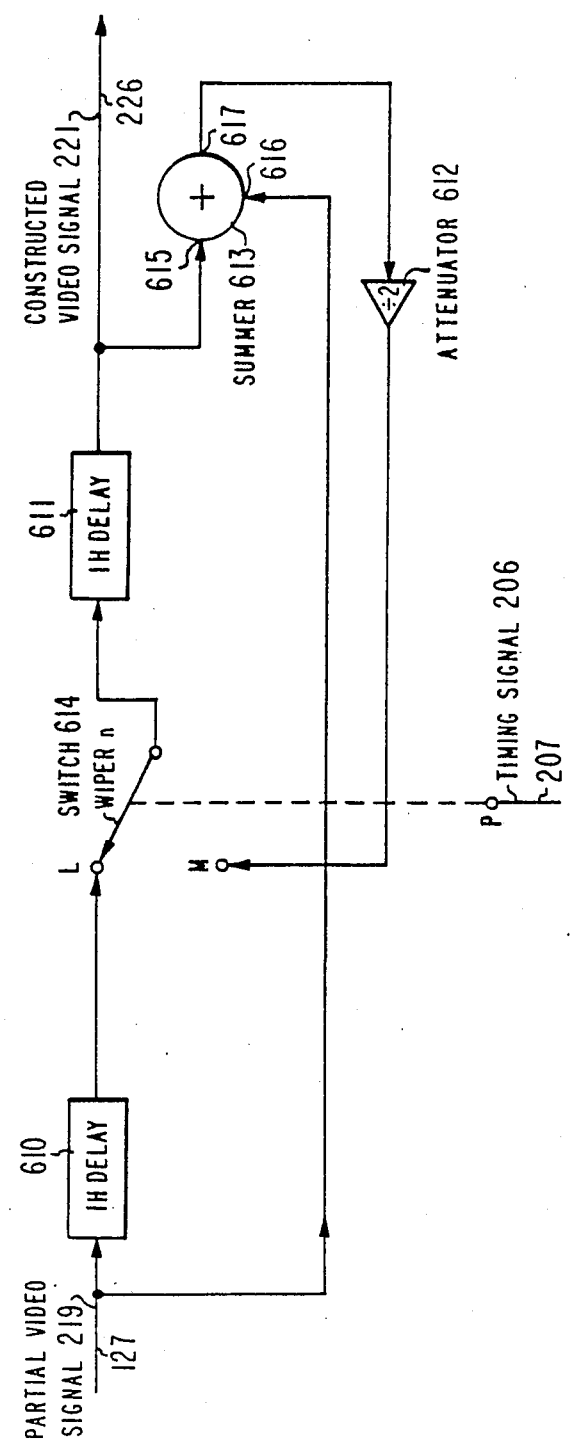
FIG. 12 illustrates a detailed embodiment of the filling video signal unit of the system of FIG. 2b.

FIG. 12 illustrates a detailed embodiment of filling video signal unit 203 of FIG. 2b. Identical numbers and symbols in FIGS. 2b and 12 indicate similar functions or items. FIGS. 11a, b and c illustrate the timing diagrams for the operation of filling video signal unit 203.

Filling video signal unit 203 of FIG. 12 provides the missing edge video signal for partial video signal 219, illustrated in FIGS. 11a, 7b and 8b with dotted lines, by using an interpolation process. In this process, right edge video signals 802 of scan lines n and n+2, respectively, of FIG. 11a, are added and then attenuated by a factor of 2 to provide a right edge filling video signal 921 for scan line n+1, illustrated in FIG. 11c. Similarly, a left edge video signals 802 of scan lines n+1 and n+3, respectively, are added and then attenuated by a factor of 2 to provide left edge video signal 900 of scan line n+2, illustrated in FIG. 11c. Left edge video signal 800 of scan line n+1, illustrated in FIG. 11a, is repeated by unit 203 to provide a left edge video signal 904 for scan line n+1, as illustrated in FIG. 11c. Right edge video signal 82 of scan line n+2, illustrated in FIG. 11a, is repeated by unit 203 to provide a right edge video signal 902 of scan line n+2, as illustrated in FIG. 11c. Inner range video signals 801 of scan lines n+2 and n+2, respectively, are repeated by unit 203 to provide an inner range video signal 901 for scan line n+1 and n+2, as illustrated in FIG. 11c.

In FIG. 12, partial video signal 219 of FIG. 11a is provided through a 1H delay 610 to a terminal L of a switch 614 and also to an input terminal 616 of a summer 613. A signal on a wiper n of switch 614 coupled through a 1H delay 611 provides constructed video signal 221 on line 226. Constructed video signal 221 is also coupled to an input terminal 615 of summer 613. An output terminal 617 of summer 613 provides the sum of the signals at terminals 615 and 616 through an attenuator 612 to a terminal M of switch 614. Attenutator 612 has attenuation factor of 2. Position L or M of wiper is controlled by a timing signal 206 provided by timing unit 205 along a line 207 to a terminal P of switch 614.

The operation of filling video signal unit 203 for obtaining constructed video signal 221 for scan line n+1 is described below; the operation of filling video signal unit 203 for obtaining constructed video signal 221 of scan line n+2 is similar.

Left edge video signal 800 of scan line n+1 illustrated in FIG. 11a is provided to terminal L of switch 614, after passing through 1H delay 610 from time t9 to time t10. Similarly, inner range video signal 801 of scan line n+1 is provided to terminal L from time t10 to time t11. Wiper n of switch 614 is at position L from time t9 to time t11 as illustrated schematically in FIG. 11b. Consequently, signals 800 and 801 are provided on line 226, from time t13 to time t14 and from time t14 to time t15, respectively, after passing through 1H delay 601 to provide left edge video signal 904 and inner range video signal 901, respectively.

To obtain right edge filling video signal 921 of scan line n+1, illustrated in FIG. 11c, right edge video signal 802 of scan line n illustrated in FIG. 11a, is delayed by two 1H delays 610 and 611. Signal 802 is therefore provided to terminal 615 of summer 613 from time t11 to time t12. Also, from time t11 to time t12, right edge video signal 802 of scan line n+2 is provided to terminal 616 of summer 613. The average value of the two signals at terminals 615 and 616 of summer 613 is provided to terminal M of switch 614. From time t11 to time t12 wiper n of switch 614 is at position M as illustrated schematically in FIG. 11b. The signal at position M propagates into 1H delay 611 from t11 to t12 and appears on line 226 from time t15 to time t16 to provide right edge filling video signal 921 as illustrated in FIG. 11c.

In an NTSC-like system, right edge filling video signal 921 of scan line n+1, for example, obtained by the circuit of FIG. 12, has a color subcarrier of 180° out of phase to that of left edge video signal 904 and inner range video signal 901 of the same scan line. This is so because it is derived from right edge video signals 802 of scan lines n and n+2, respectively, which are adjacent scan lines to scan line n+1. To compensate for this 180° phase differential, timing unit 205 provides color carrier 227 to luma/chroma 201 of FIG. 2b with a corresponding 180° phase shift from time t15 to time t16.

One reason for providing a filling video signal such as right and left edge filling video signals 921 and 900 of FIG. 11c is that it is desirable to provide picture information in the edges of all the scan lines of cathode ray tube 200 of FIG. 2b to avoid introducing artifacts due to the absence of picture information. Additional artifacts resulting from beam turn-on and turn-off transients are also eliminated by displaying the filling video signal.

The filling video signal may also be obtained by a circuit similar to that illustrated in FIG. 12 but in which summer 613 and attenuator 612 are removed and constructed video signal 221 is coupled to terminal M of switch 614 of FIG. 12, instead. In such an embodiment, right edge filling video signal 921 of scan line n+1 illustrated in FIG. 11c is made to contain the same video information as right edge video signal 902 of scan line n of FIG. 11c. Therefore, the edge video signal of one scan line, in such embodiment, is repeated in the subsequent scan line to provide the filling video signal.

Yet another variation of providing the filling video signal may be accomplished by selecting the supplemental video signals of scan lines of different fields or different frames for processing. It should be understood that other processes and techniques of interpolation for obtaining the filling video signal feature of the invention may be employed.

Still in another embodiment of the invention, the left edge and the right edge of a scan line may be provided with video information provided by the associated supplemental video signal or by a filling video signal, alternately, according to a given rule. For example, in one picture frame the left edge of a scan line may be provided with a supplemental video signal and the right edge of the scan line may display a filling video signal; on the other hand, in the subsequent picture frame the left edge may display a filling video signal and the right edge may be provided with video information provided by the associated supplemental video signal.

Figure 13:
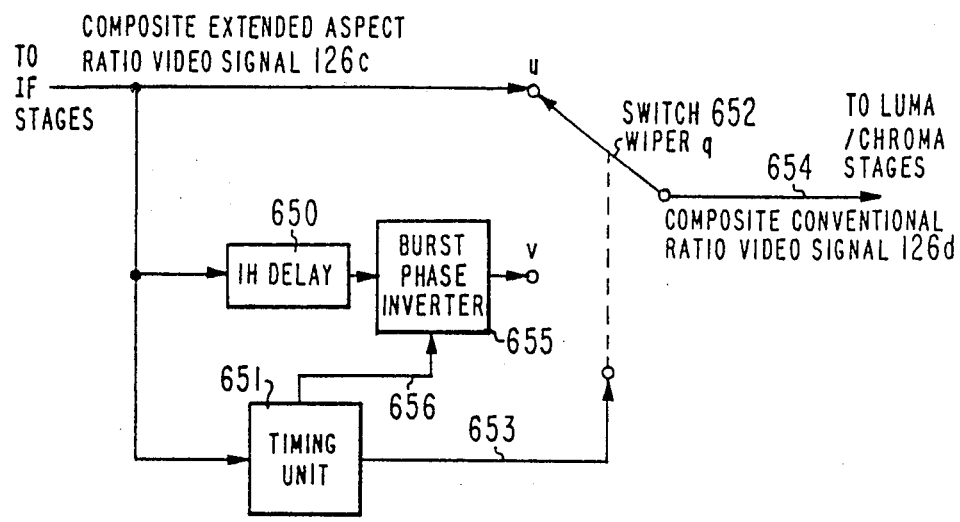
FIG. 13 illustrates a circuit to be used with a conventional television receiver for receiving the composite extended video signal of FIG. 3c.

FIG. 13 illustrates a circuit for removing supplemental video signals 303 and 304 of FIG. 3c and for substituting instead horizontal sync pulse 300 and color burst 301. The circuit of FIG. 13 enables a conventional television receiver to receive and display conventional aspect ratio video signals 302 and 305 illustrated in FIG. 3c. Thus, scan lines n and n+1 of a display having a conventional aspect ratio may display conventional aspect ratio video signals 302 and 305 respectively, without causing dimensional distortions of the picture. The circuit of FIG. 13 may be located between the IF stages and the luma/chroma processing stages of the conventional aspect ratio television receiver.

Composite extended video signal 126c such as provided to the circuit of FIG. 2b is coupled to a terminal u of a switch 652, to a terminal v of switch 654 through 1H delay 650 followed by a burst phase inverter 655 and to a timing unit 651. A wiper q controlled by a timing signal 653 of timing unit 651 couples signal 126c at terminal n from time T0 to time T2 and from T3 to time T4 of FIG. 3c. Wiper q couples the signal at terminal v of switch 652 from time T2 to time T3 of FIG. 3c. Burst phase invert 655, controlled by a timing signal 656 of timing unit 651 inverts the phase of color burst 301 of the previous scan line. thus wiper q couples sync 300 and color burst 301 of the previous scan line having its phase inverted instead of supplemental video signals 304 and 303 signal 126c illustrated in FIG. 3c. In this way, wiper q provides composite conventional video signal 126d of FIG. 3d on a line 654. Signal 126d, being the conventional NTSC signal, for example, may be displayed in a conventional television receiver.

A television receiver having an extended aspect ratio display screen may also be equipped with circuitry for displaying a composite conventional aspect ratio video signal such as illustrated in FIG. 3d on its display. For example, in an image area 150 of FIG. 1, inner rectangle 24 may be utilized for displaying a picture having a conventional aspect ratio.

The embodiment of the invention illustrated in FIGS. 2b for receiving composite extended video signal 126c of FIG. 3c is also capable of displaying picture information provided by the composite conventional video signal 126d of FIG. 3d even without additional circuitry. For example, conventional aspect ratio signal 302 and 305 of FIG. 3d may be displayed in inner rectangle 24 of image area 150, thus the resulting picture may have a conventional aspect ratio.

What is claimed is:

1. A television apparatus for generating an extended video signal that contains portions of picture information to be displayed in a plurality of display lines of a television display wherein each one of said display lines includes an inner range portion located inside an inner image display area having dimensions of a first aspect ratio and includes first and second outer range portions located outside said inner image display area, said plurality of display lines defining an image display area having dimensions of a second aspect ratio that is extended relative to said first aspect ratio, said apparatus comprising:

signal source means for providing a video input signal;

means for generating from said video input signal a first signal part of said extended video signal that contains picture information to be displayed in the inner range portions of said plurality of display lines;

means for generating from said video input signal a second signal part of said extended video signal that contains picture information to be displayed in the first outer range portions of said plurality of display lines;

means for generating from said video input signal a third signal part of said extended video signal that contains picture information to be displayed in the second outer range portions of said plurality of display lines;

means for combining said first, second and third signal parts of said video input signal for generating said extended video signal such that all the picture information contained in said extended video signal during a first one of said plurality of display lines is to be displayed in the inner range portion and in only one of said first and second outer range portions of said first one display line and such that all the picture information contained in said extended video signal during a second one of said plurality of display lines is to be displayed in the inner range portion and in only the other one of said first and second outer range portions and wherein:

said first part of said extended video signal has a time duration equal to a picture representative portion of a scan line of a given broadcast standard;

said second and third parts of said extended video signal each have a duration equal to a fraction of a horizontal blanking interval of said given broadcast standard; and wherein said second and third parts of said extended video signal are conveyed during alternate horizontal blanking intervals of said extended video signal.

2. Television display apparatus, comprising:

a source for providing a video input signal representative of a wide screen image having a center portion and left and right end portions, each field of said video input signal comprising alternating first and second lines in which each first line conveys said center portion and one end portion of said image and each second line conveys said center portion and the other of said end portion of said image, each said end portion occurring within a time interval of each line of said video input signal corresponding to a portion of a horizontal blanking interval of a given broadcast standard;

circuit means coupled to said input means and responsive to said video input signal for providing a processed video output signal in which every other line thereof includes said central portion preceded by said left end portion and followed by an interpolated right end portion and in which each intermediate line thereof includes said central portion preceded by an interpolated left end portion and followed by said right end portions; and display means coupled to said circuit means for displaying said processed video output signal.

3. An encoder, comprising:

a source for providing a video input signal representative of a wide screen image having an aspect ratio greater than 4:3, each line of said video input signal comprising a central portion and two end portions, said central portion corresponding to a portion of said image having a 4:3 aspect ratio;

a single transmission channel; and circuit means for sequentially coupling said central portion and one of said end portions of said video input signal to said transmission channel during alternate line intervals and for sequentially coupling said central portion and the other of said end portions of said video input signal to said transmission channel during intermediate line intervals to provide a processed output signal for said transmission channel in which each line includes said central portion and only one of said end portions with said end portions alternating line by line and in which each said end portions of said processed video signal is timed to occur in an interval corresponding to a portion of a blanking interval of a given television broadcast standard.

* * * * *